United States Patent [19]

Nakamura

[11] Patent Number: 5,386,544
[45] Date of Patent: Jan. 31, 1995

[54] DATA PROCESSING SYSTEM WITH A STANDBY PROCESS MECHANISM FOR SAVING AND RESTORING OPERATIONS

[75] Inventor: Kei Nakamura, Kawasaki, Japan

[73] Assignee: Fujitsu, Ltd., Kawasaki, Japan

[21] Appl. No.: 886,238

[22] Filed: May 21, 1992

[30] Foreign Application Priority Data

Jun. 3, 1991 [JP] Japan .................. 3-130170

[51] Int. Cl.⁶ .................. G06F 11/14; G06F 11/00
[52] U.S. Cl. .................. 395/575; 371/8.1; 371/10.1
[58] Field of Search .................. 371/7, 9.1, 11.1, 11.2, 371/8.1; 395/575, 650; 364/944.6, 268, 268.9, 269.2

[56] References Cited

U.S. PATENT DOCUMENTS

| | | | |
|---|---|---|---|
| 4,412,281 | 10/1983 | Works | 364/200 |
| 4,455,601 | 6/1984 | Griscom et al. | 364/200 |
| 4,823,256 | 4/1989 | Bishop | 364/200 |
| 4,975,838 | 12/1990 | Mizuno et al. | 364/200 |
| 5,088,021 | 2/1992 | McLaughlin et al. | 364/187 |
| 5,157,663 | 10/1992 | Major et al. | 371/9.1 |
| 5,202,980 | 4/1993 | Morita et al. | 395/575 |
| 5,222,217 | 6/1993 | Blount et al. | 395/325 |

FOREIGN PATENT DOCUMENTS 0054948  3/1989  Japan .................. 364/200

*Primary Examiner*—Robert W. Beausoliel, Jr.
*Assistant Examiner*—Norman M. Wright
*Attorney, Agent, or Firm*—Staas & Halsey

[57] ABSTRACT

A data processing system for gaining access to resources by performing message communications with resource managers within a range of given capabilities, in which given capabilities are saved in a non-volatile memory at the start-up of a currently operating process so that when recovery is attempted at the time of a failure, a standby process can take over the resource access by fetching the capabilities from the non-volatile memory and restoring them.

11 Claims, 7 Drawing Sheets

FIG. 3

STEP(1)
CURRENTLY OPERATING PROCESS CONTROLS DESTINATION TABLE

| DESTINATION OF SERVER A | CLI = 1 |
|---|---|
| DESTINATION OF SERVER B | CLI = 2 |
| DESTINATION OF SERVER C | CLI = 3 |

26

STEP(2)
CURRENTLY OPERATING PROCESS DESIGNATES CLI=1,2,3, AND REQUESTS TO SAVE THREE CAPABILITIES

STEP(3)
KERNEL SAVES THE CONTENTS OF CAPABILITIES CORRESPONDING TO THE DESIGNATED CLI IN AN EXCLUSIVE SAVE AREA.
KERNEL RETURNS TOKENS (IDENTIFIERS) CORRESPONDING TO THE CLIs.

27

CONTENTS OF CAPABILITIES CORRESPONDING TO CLI=1→TOKEN = a

CONTENTS OF CAPABILITIES CORRESPONDING TO CLI=2→TOKEN = b

CONTENTS OF CAPABILITIES CORRESPONDING TO CLI=3→TOKEN = c (NON-VOLATILE AREA)

28

STEP(4)
CURRENTLY OPERATING PROCESS STORES AS ITS OWN TAKEOVER DATA THAT CAPABILITIES ARE SAVED.

| DESTINATION OF SERVER A | TOKEN = a FOR CLI = 1 |
|---|---|
| DESTINATION OF SERVER B | TOKEN = b FOR CLI = 2 |
| DESTINATION OF SERVER C | TOKEN = c FOR CLI = 3 |

DATA PROCESSING SYSTEM WITH A STANDBY PROCESS MECHANISM FOR SAVING AND RESTORING OPERATIONS

BACKGROUND OF THE INVENTION

1. FIELD OF THE INVENTION

This invention relates to a data processing system having a mechanism for saving and restoring capabilities, and more particularly to a data processing system having a mechanism for saving and restoring capabilities and performing message communications with a resource manager, etc., within given capabilities, in which arrangement is made to enable a standby process to take over processing from a currently operating process. That is, to restore the capabilities when recovery is attempted at the time of a failure.

DESCRIPTION OF THE PRIOR ART

Heretofore, it is general practice in a data processing system that predetermined capabilities are given to a process so that the process can execute processing to gain access to a predetermined resource within a range of the capabilities. In other words, that process, which has been informed in advance within a range of the aforementioned capabilities, has a destination for messages a resource manager and requests the resource manager to access a resource by transmitting a message towards the resource manager.

In such a data processing system, a currently operating process and a standby process are provided so that the standby process can take over the processing conducted by the currently operating process as recovery is attempted in the event of failure of the currently operating process. In such a case, it is necessary for the standby process to take over the capabilities given to the currently operating process. That is, it is necessary in realizing a fault-tolerant message-based system to ensure message paths between processes for a standby process which takes over the processing conducted by the currently operating process, even when the currently operating process crashes.

To this end, arrangement is made in the prior art to inform both the currently operating process and the standby process of the aforementioned capabilities so that the currently operating process, in the normal operation, can gain access to the resource manager on the basis of the capabilities given to the currently operating process, while in the event of failure of the currently operating process, the standby process takes over the capabilities of which the currently operating process has informed the standby process in advance.

In this system, however, when the failed process is recovered, both processes have to be informed from scratch of the capabilities via communications between processes, as in the above case.

As a measure to solve the complexity involved in informing both processes of the capabilities via communications between processes the following method is known.

The capabilities are stored in an external memory medium as non-volatile data so that the currently operating process fetches the contents of the capabilities from the external memory medium in performing resource access via normal message communications; whereas the standby process takes over the capabilities stored in the external memory medium when the currently operating process fails.

In this method, however, access has to be made to the external memory medium to know destination information every time resource access is made via normal message communications. This leads to increased overhead under normal operating conditions.

SUMMARY OF THE INVENTION

It is an object of this invention to provide a data processing system in which each process gains access to a resource while communicating messages with each other in accordance with capabilities given to each process. When a currently operating process fails, a standby process is caused to take over the capabilities possessed by the currently operating process.

It is another object of this invention to prevent the unwanted increase in overhead during the time in which the currently operating process performs normal processing.

It is a further object of this invention to ensure that the aforementioned takeover is carried out properly in the event of failure of the currently operating process merely by saving the capabilities given to the currently operating process in a non-volatile memory.

BRIEF DESCRIPTION OF THE DRAWINGS

FIG. 3 is a flow chart explaining the process required for saving capabilities;

DESCRIPTION OF THE PREFERRED EMBODIMENTS

First, the prior art will be described, referring to FIGS. 7 and 8.

Figure 7:
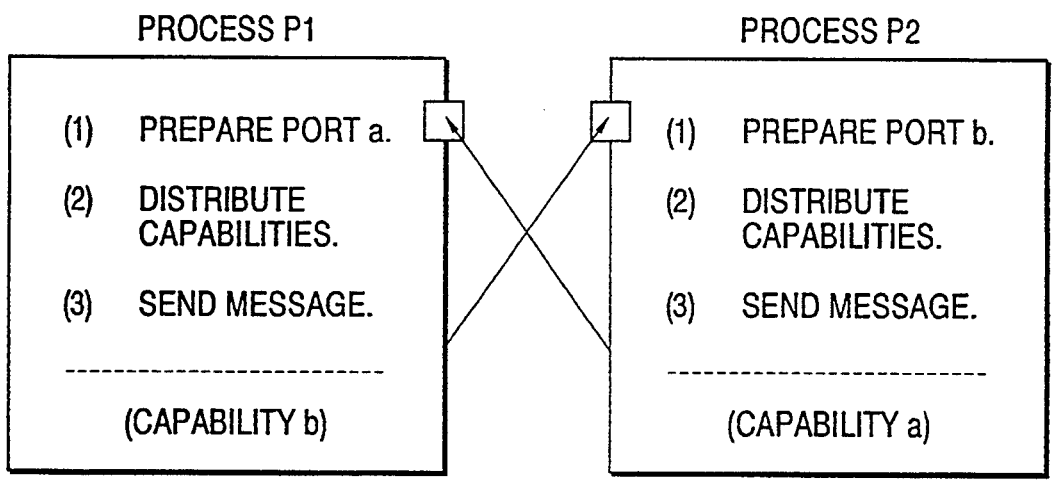
FIG. 7 is a diagram explaining an example of message communications according to the prior art.

In a message-based system, message communications are effected by establishing message paths in accordance with communications procedures as shown in FIG. 7, for example. In the following description, ①–② correspond to ①–② shown in FIG. 7.

① Provide windows (referred to as ports) for message communications for each process.

② Distribute destinations to these ports. By giving destination information to a process concerned, communications are made possible and the capabilities for performing the message communications are given to that process.

As a result, processes P1 and P2 share the capabilities possessed by their respective counterpart by sharing destination information with each other.

③ In normal operations, each of the processes P1 and P2 performs message communications using its own capabilities.

Now, assume that a process P1 crashes. In order for the process P1 to resume message communications after the process P1 is restarred, the above procedures ①–③ have to be repeated.

Figure 8:
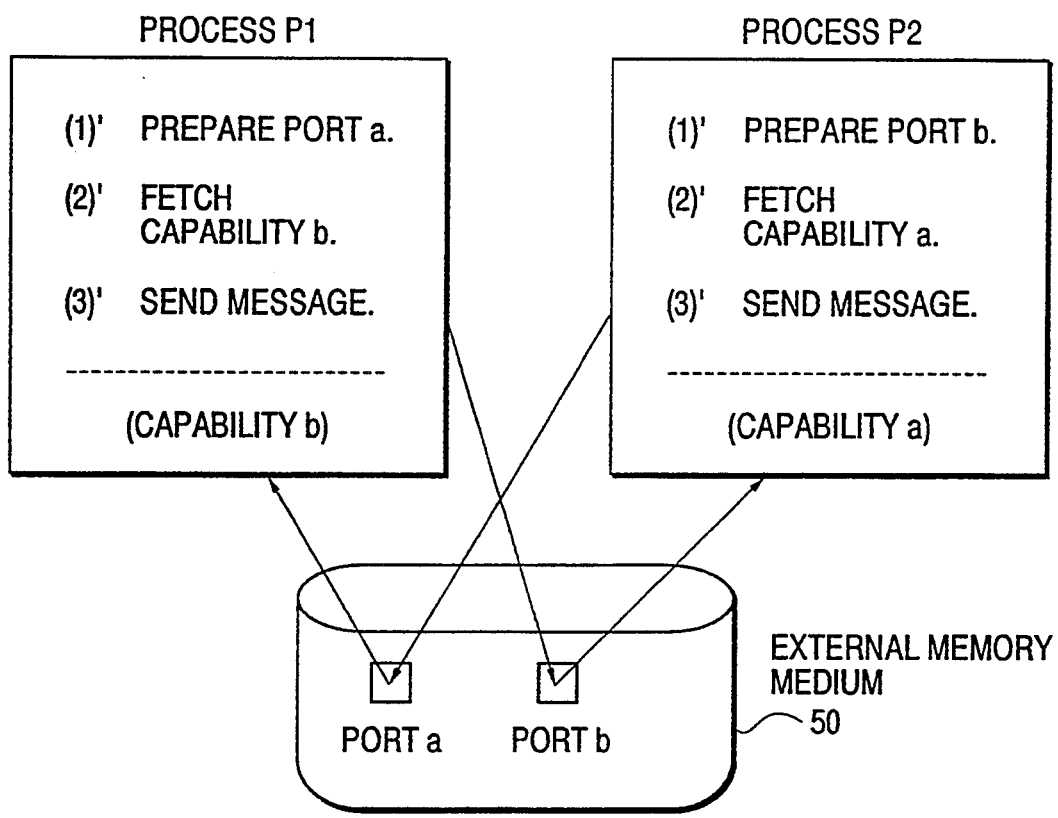
FIG. 8 is a diagram explaining an example of prior art message communications using an external memory medium.

A new method has been proposed, on the other hand, in which the ports a and b serving as windows are moved to an external memory medium 50, while the external memory medium 50 is made non-volatile, so as to ensure the use of ports as destinations, independently of the crashing of a process, as shown in FIG. 8.

In the procedure ①' in FIG. 8, ports a and b are provided in the external memory medium 50.

In the procedure ②', the capabilities possessed by the counterpart process are fetched from the external memory medium 50.

In the procedure ③', each process normally performs message communications by fetching its own capabilities from the external memory medium 50 every time the need for message communications arises.

In this method, however, the normal message communications as shown in ③' in FIG. 8 are carried out by gaining access to the port on the external memory medium 50 to obtain destination information. This could deteriorate the steady-state performance of the system.

This invention is intended to solve the aforementioned problems by preventing overhead in the steady-state message communications, and by ensuring continued message communications in the event of failure of a process without receiving capabilities again from the process concerned.

Figure 1:
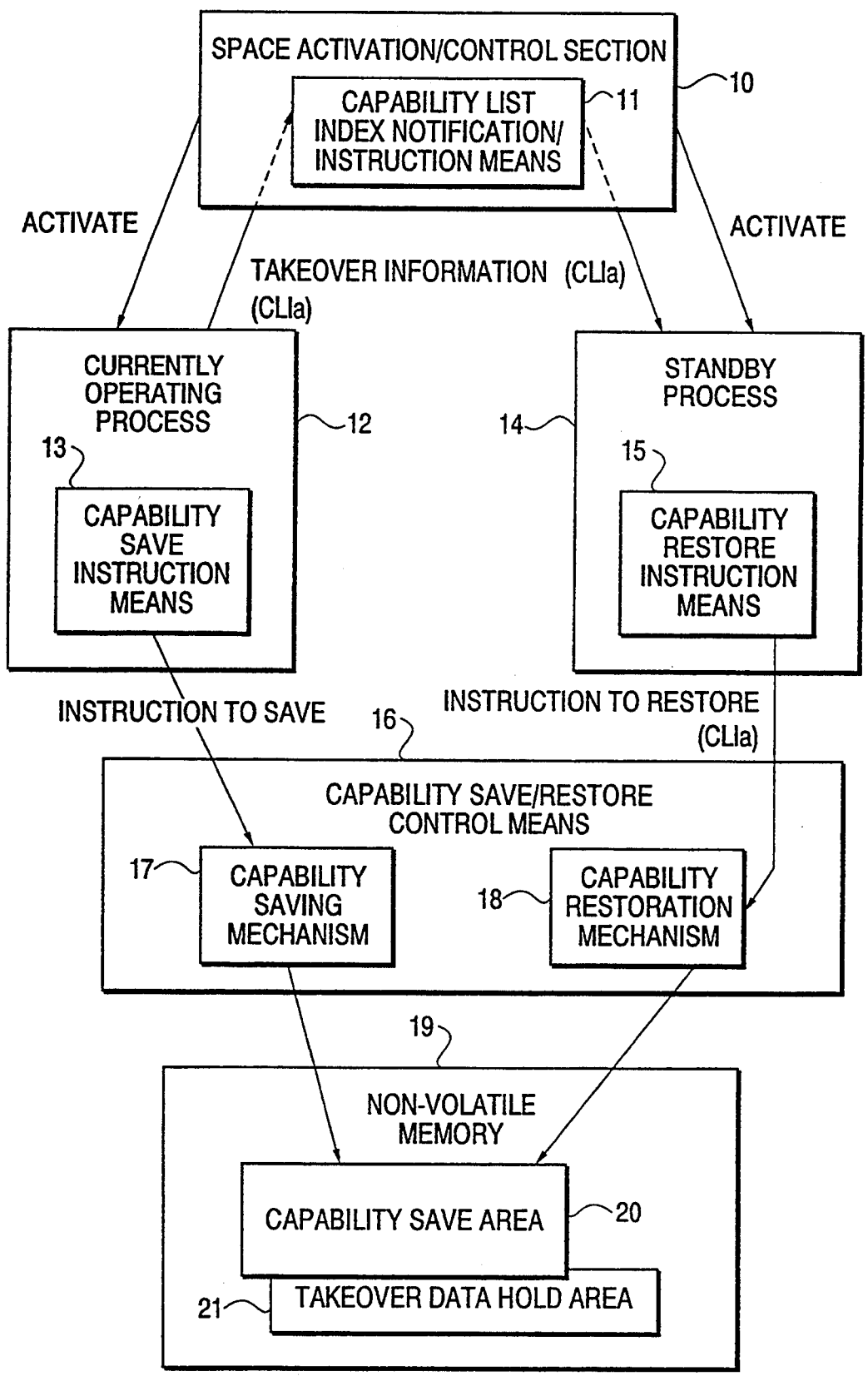
FIG. 1 is a diagram explaining the operating principle of the present invention.

FIG. 1 is a diagram illustrating the principle of this invention.

In FIG. 1, numeral 10 refers to a space activation/control section having a function of activating and controlling the operating space for a process. Numeral 11 refers to a capability list index notification/instruction means to notify that capability index information is to be taken over from a currently operating process to a standby process. Numeral 12 refers to a currently operating process for performing services. Numeral 13 refers to a capability save instruction unit for instructing the saving of the held capabilities. Numeral 14 refers to a standby process taking over services in the event of failure of a currently operating process. Numeral 15 refers to a capability to restore instruction unit for instructing the restoration of capabilities numeral 16 refers to a capability to save/restore control unit for controlling the saving and restoration of capabilities. Numeral 17 refers to a capability saving mechanism, 18 refers to a capability restoration mechanism; 19 to a non-volatile memory for storing the contents even in a crash, 20 refers to a capability save area, and 21 refers to a capability list index (takeover data) hold area, respectively.

In a system shown in FIG. 1, the destination of a message addressed to a resource manager to authorize the operation of resources is controlled by capability information (hereinafter referred to as "capabilities").

The capability save area 20 is an area secured on the non-volatile memory 19 to save the capability now in use. The capability list index, CLI held in the capability list index (takeover data) hold area 21 is the information required for indexing individual capabilities on the non-volatile memory 19.

The capability save instruction unit 13 is a processing means for instructing the capability save/restore control unit 16 to restore the capability held by the currently operating process 12 from the capability save area 20.

Upon receipt of a save instruction from the capability save instruction means 13, the capability save/restore control unit 16 saves the capability to the capability save area 20 on the non-volatile memory 19 via the capability saving mechanism 17. Upon receipt of a restore instruction from the capability restore instruction unit 15, the capability save/restore control unit 16 reads and restores the capability saved in the capability save area 20 via the capability restoration mechanism 18. At this moment, needless to say, control is effected to give the standby process 14 an access right to the capability save area 20.

The capability saving mechanism 17 has a function to secure the capability save areas 20 on the non-volatile memory 19, divide the areas on the medium into subareas, and control the vacant subareas. Upon receipt of an instruction from the capability save instruction unit 13 of the currently operating process 12 to save the capability being taken over, a vacant subarea is secured from the capability save area 20, and the contents of the capability held in the memory of the currently operating process 12 is saved to the capability area 20. Thus, a replica of the capability held by the currently operating process 12 in its own memory is stored in the non-volatile memory 19.

When the standby process 14 takes over the currently operating process 12 in the event of failure of the currently operating process 12, upon receipt of an instruction from the capability restore instruction unit 15 to restore a capability, the capability restoration mechanism 18 searches for the replica of the capability saved in the capability area 20 by way of another capability that permits the capability save area 20 to be accessed, and restores it to a form that can be used by the standby process 14. Any requests for restoration from other unauthorized processes are inhibited for security reasons.

Figure 2:
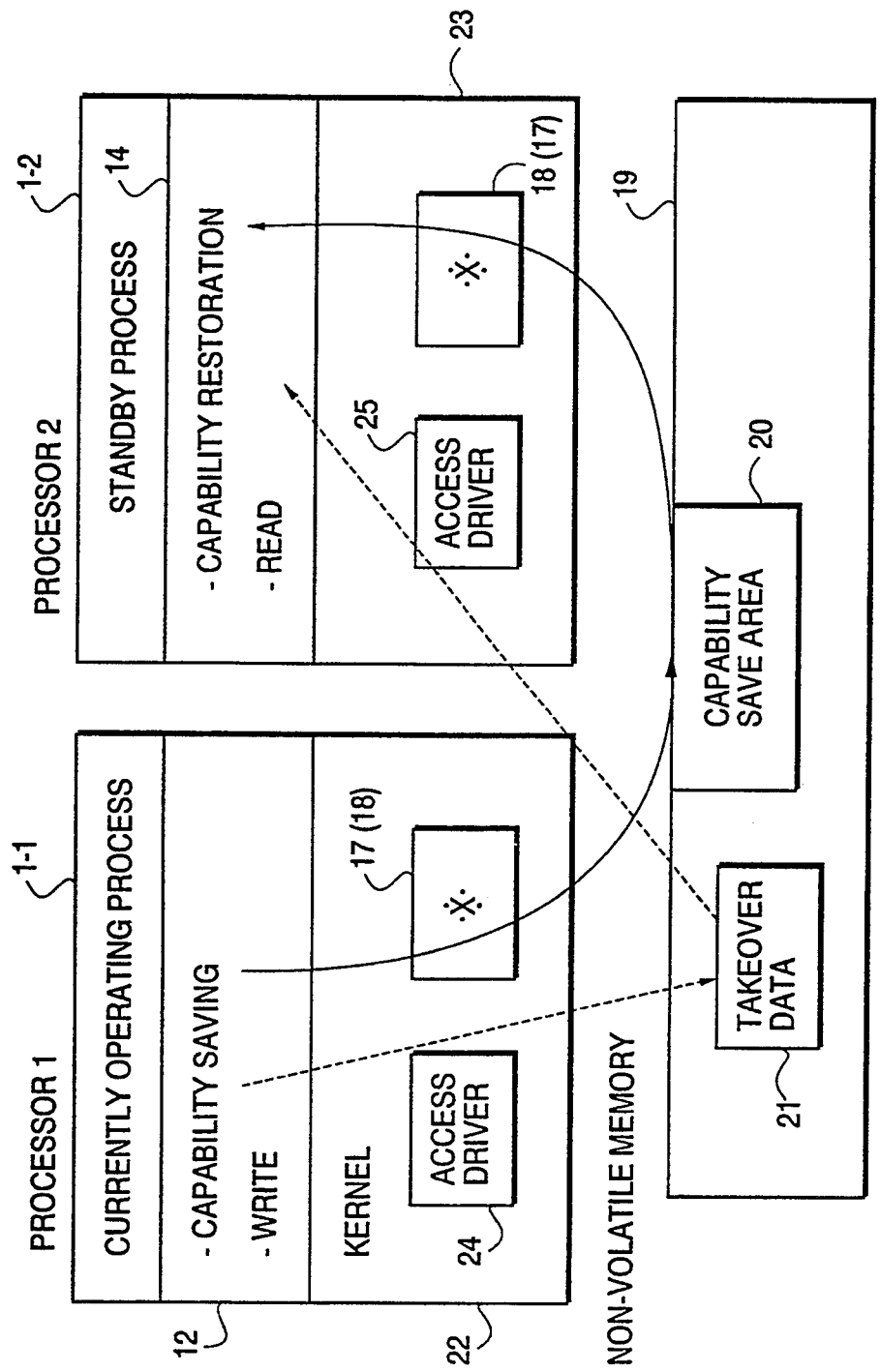
FIG. 2 is a diagram explaining the manner of saving and restoring capabilities in the present invention.

FIG. 2 is a diagram explaining the manner of saving and restoring of capabilities in this invention. In FIG. 2, reference numerals 12, 14, 17, 18, 19, 20 and 21 correspond to the same numerals used in FIG. 1, 1–1 and 1–2 refer to processors, 22 and 23 refers to kernels, and 24 and 25 refer to non-volatile memory access drivers, respectively.

The following processing is performed at the time of initialization of the process 12. It is assumed that the process 12 already knows capabilities given to it at this moment.

Figure 4:
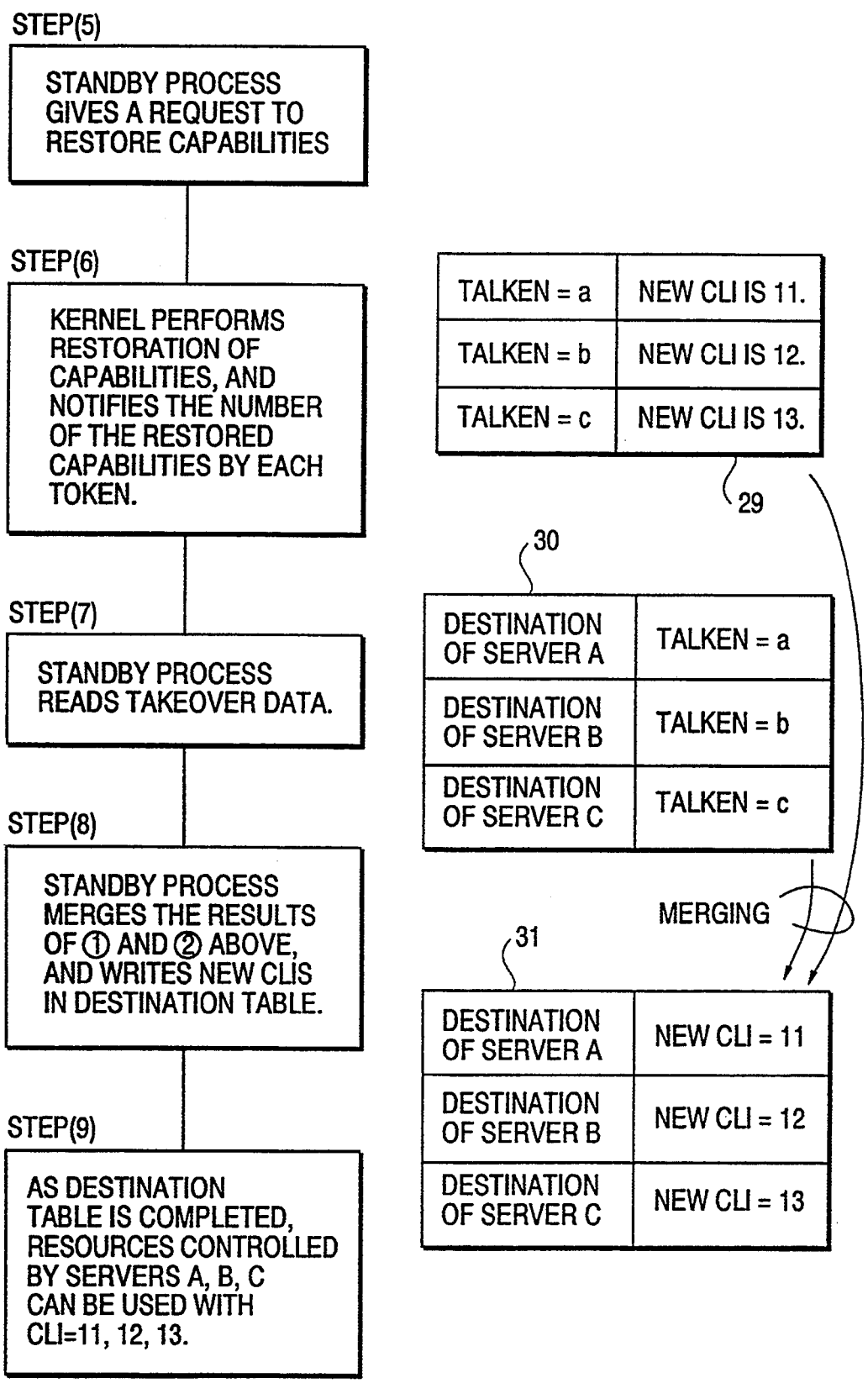
FIG. 4 is a flow chart explaining the process required for restoring capabilities.

In the following, the saving processing of a capability will be described, also referring to FIG. 3, and the restoration processing of a capability will be described, referring to FIG. 4. In FIGS. 3 and 4, numerals 26 through 31 denote tabled control information.

STEP (1): The currently operating process 12 determines (i) that a server A is designated as the destination for a capability list index (CLI=1) for performing a certain processing, (ii) that a server B is designated as the destination for another capability list index (CLI=2) for performing another processing, and (iii) that a server C is designated as the destination for still a further capability list index (CLI=3) for performing still a further processing, as shown in the control information 26.

STEP (2): At the time of startup, the currently operating process 12 requests the kernel 22 to save three capabilities by designating the above-mentioned indices CLI=1, CLI=2 and CLI=3. The contents of these capabilities are destinations of the servers mentioned above. Needless to say, that the process knows these destinations means that the process has access rights to the servers.

STEP (3): The kernel 22 accesses the non-volatile memory 19 via the access driver 24, and saves the contents of the capability to the non-volatile memory 19 via the save/restore mechanism 17 (18). That is, the kernel 22 saves the contents of the capability corresponding to the designated index CLI=i to the non-volatile memory 19, and returns a token (identifier) corresponding to the index CLI=i to the currently operating process 12, as shown in the control information 27 shown in the figure. Takeover data is stored in the takeover data hold area 21, so that (i) when the non-volatile memory 19 is accessed by a token=a, the contents of the capability corresponding to the index CLI=1 is fetched, (ii) when the memory 19 is accessed by a token=b, the contents of the capability corresponding to the index CLI=2 is fetched, and (iii) when the memory 19 is accessed by a token=c, the contents of the capability corresponding to the index CLI=3 is fetched.

STEP (4): The currently operating process 12 (i) holds that saving is effected with the token=a for the index CLI=1, (ii) holds that saving is effected with the token=b for the index CLI=2, and (iii) holds that saving is effected with the token=c for the index CLI=3.

In this way, a replica of the capabilities possessed by tile currently operating process 12 are saved in the non-volatile memory 19. Needless to say, the currently operating process 12 carries out message communications with the servers A through C in normal operations on the basis of the control information 28 shown in FIG. 3. That is, message communications are performed on the basis of the control information existing in the memory possessed by the currently operating process 12.

Now, assume that the current operating process fails in this state. At this moment, the space activation/control section 10 given the standby process 14 an instruction to receive the above-mentioned capability list index by means of the capability list index notification/instruction means 11.

The operation of the standby process 14 that receives an instruction as it is informed of the token=a, the token=b, and the token=c by the space activation/control means 10 will be described, referring to FIG. 4.

STEP 5: Upon receipt of the instruction, the standby process 14 requests the kernel 23 to read the capability in the non-volatile memory 19 so that the capability can be recognized by the standby process 14. That is, it requests the kernel 23 to restore the capability.

STEP 6: The kernel 23 accesses the non-volatile memory 19 via the access driver 25. The save/restore mechanism 18 restores capabilities and fetches the takeover data from the non-volatile memory 19, and informs that (i)-the capability corresponding to the token=a has been restored as that having a new index of CLI=11, that (ii) the capability corresponding to the token=b has been restored as that having a new index of CLI=12, and that (iii) the capability corresponding to the token=c has been restored as that having a new index of CLI=13. The control information 29 shown in the figure outlines this state.

STEP 7: The standby process 14 reads from the non-volatile memory 19 the contents of the capability, that is, (i) the "destination of the server A" corresponding to the token-a, (ii) the "destination of the server B" corresponding to the token-b, and (iii) the "destination of the server C" corresponding to the token=c, and obtains the control information 30.

STEP 8: The standby process 14 merges the control information 29 and the control information 30 to obtain the control information 31. That is, (i) the "destination of the server A" is related to a new capability list index, New CLI=11, (ii) the "destination of the server B" is related to a new capability list index, New CLI=12, and (iii) the "destination of the server C" is related to a new capability list index, New CLI=13.

STEP 9: In this state, the standby process 14 communicates with the server A, the server B and the server C, using these new indices New CLI=11, New CLI=12 and New CLI=13, and thereby uses their respective resources. That is, in place of the crashed currently operating process 12, the standby process 14 can use the server A, the server B and the server C by taking over the capabilities of the failed currently operating process 12.

Figure 5:
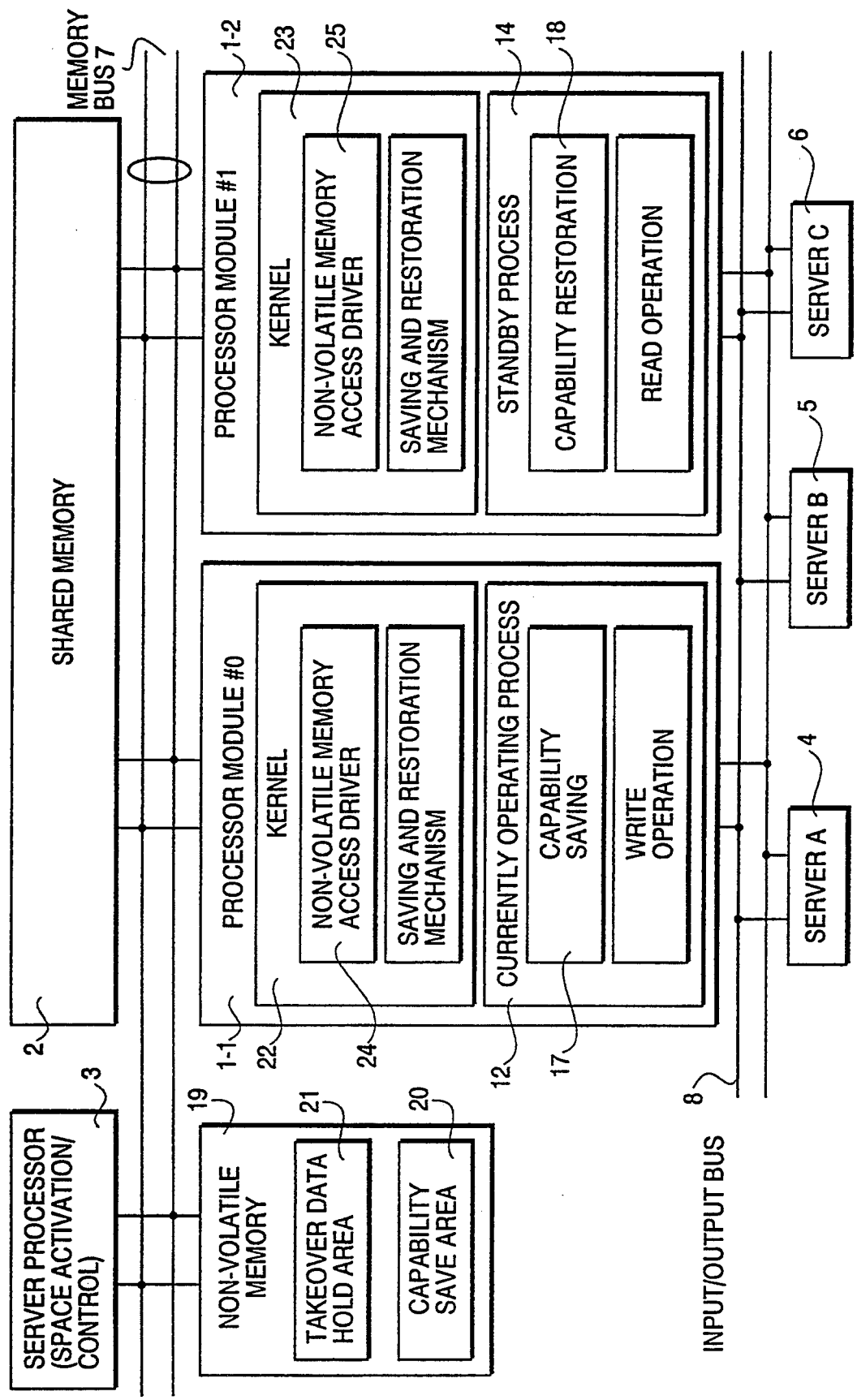
FIG. 5 is a block diagram of an embodiment according to the present invention.

FIG. 5 shows the construction of an embodiment of this invention. In FIG. 5, numerals 1-1, 1-2, 12, 14, 17, 18, 19, 20, 21, 22, 23, 24 and 25 correspond to the same numbers in FIG. 1 or 2. Numeral 2 refers to a shared memory, 4 to a server A, 5 to a server B, 6 to a server C, 7 to a memory bus, and 8 to an input/output bus, respectively.

Furthermore, numeral 3 refers to a server processor which performs space control, including the functions of the space activation/control unit 10 shown in FIG. 1. Needless to say, the server processor 3 controls whether the currently operating process 12 crashes. If the currently operating process 12 crashes, the server processor 3 gives the standby process 14 an instruction to restore.

The shared memory 2 is a memory shared by the processor modules #0 and #1. The servers A, B and C perform message communications with the currently operating process 12 and the standby process 14, access the resources the servers themselves hold, and send those resources to each process.

The reason why the term "processor module" is used with reference to FIG. 5 is that there are a plurality of processors in a single processor module. In this invention, however, the presence of a plurality of processors in a processor module is not an essential condition.

In the construction shown in FIG. 5, the processing of saving and restoring capabilities is similar to that described with reference to FIGS. 1 through 4. Detailed description is therefore omitted here, but the processing can be outlined as follows.

(a) The currently operating process 12 saves a replica of capabilities in the non-volatile memory 19 in advance, (b) the currently operating process 12 during normal processing communicates with the servers A through C without reading the contents of the non-volatile memory 19, (c) if the currently operating process 12 crashes, the server processor 3 gives the standby process 14 an instruction to take over, and (d) the standby process 14 receives from the non-volatile memory 19 the capabilities given to the currently operating process 12, and thenceforth communicates with the servers A through C.

Figure 6:
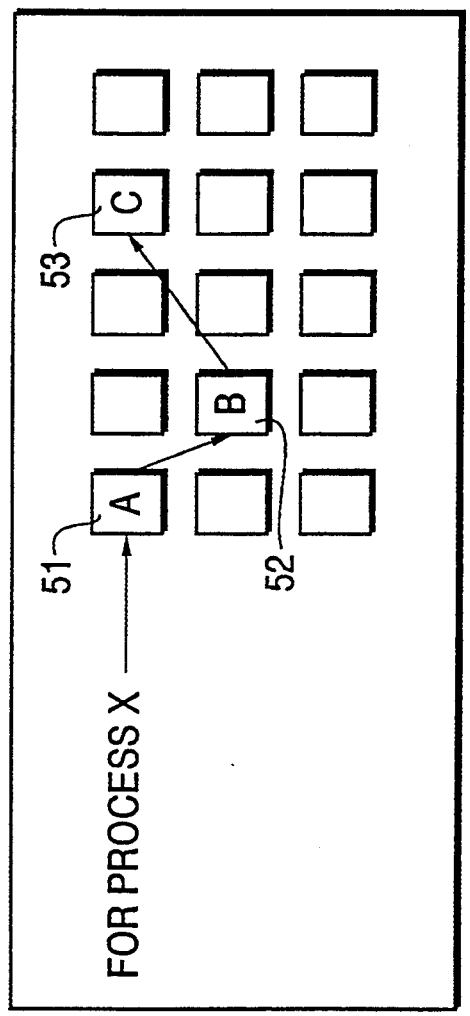
FIG. 6 is a diagram explaining the state where capabilities are stored in a non-volatile memory.

FIG. 6 is a diagram of assistance in explaining the state where capabilities are stored in the non-volatile memory 19. Numeral 20 refers to a capability save area, as shown in FIG. 1.

In the capability save area 20, capabilities given to a certain process X are chained, corresponding to the process X, and held. That is, if the process X can communicate with the servers A, B and C, an information area 51 in which the destination of the server A is described, an information area 52 in which the destination of the server B is described, and an information 53 in which the destination of the server C is described are indicated by pointers and chained.

As described above, this invention makes it possible to eliminate the need for the currently operating process 12 in the normal processing state to read the contents of the non-volatile memory 19 in communicating with the server A, and enables the standby process to take over the capabilities possessed by the currently operating process 12 in the event of failure of the currently operating process 12. Needless to say, in order for still another process to take over the capabilities from the standby process 14, it is sufficient for that process to receive an instruction for that process to take over.

What is claimed is:

1. A data processing system having a mechanism for saving and restoring capabilities in a message-based data processing system having a plurality of processes, including a currently operating process and a standby process, each process accessing resources while communicating with individual servers within capabilities given to each process, said data processing system comprising:

a capability save area which is an area in a non-volatile memory for saving the capabilities;

capability save instruction means for giving an instruction to save a replica of the capabilities held by the currently operating process in said capability save area;

capability list index notification/instruction means for giving the standby process an instruction to take over from the currently operating process the capabilities saved in said capability save area;

capability restore instruction means for giving said standby process an instruction to restore the capabilities held by the currently operating process when the standby process takes over the currently operating process; and capability save/restore control means for performing saving and restoration in said capability save area in response to a save instruction given by said capability save instruction means, and in response to a restore instruction given by said capability restore instruction means.

2. A data processing system having a mechanism for saving and restoring capabilities as set forth in claim 1, wherein said capability save instruction means exists in the currently operating process, and wherein said capability restore instruction means exists in the standby process.

3. A data processing system having a mechanism for saving and restoring capabilities as set forth in claim 1, wherein said capability save/restore control means exists in a kernel of an operational system.

4. A data processing system having a mechanism for saving and restoring capabilities as set forth in claim 3, wherein the currently operating process requests said kernel to save capabilities by giving capability list indices corresponding to the contents of individual capabilities.

5. A data processing system having a mechanism for saving and restoring capabilities as set forth in claim 4, wherein said kernel saves the contents of capabilities in said non-volatile memory, and notifies said currently operating process of tokens corresponding to the contents of individual capabilities.

6. A data processing system having a mechanism for saving and restoring capabilities as set forth in claim 5, wherein said capability list index notification/instruction means, when said currently operating process fails, notifies said tokens to give said standby process an instruction to take over.

7. A data processing system having a mechanism for saving and restoring capabilities as set forth in claim 6, wherein said standby process requests said kernel to restore said capabilities from said non-volatile memory on the basis of said notified tokens.

8. A data processing system having a mechanism for saving and restoring capabilities as set forth in claim 7, wherein said kernel receiving a restore instruction from the standby process notifies the standby process of new capability list indices corresponding to said tokens.

9. A data processing system having a mechanism for saving and restoring capabilities as set forth in claim 8, wherein the standby process associates the contents of the capabilities fetched from said non-volatile memory with said new capability list indices.

10. A data processing system having a mechanism for saving and restoring capabilities as set forth in claim 3, wherein said processes and kernels corresponding therewith exist in processors or processor modules, and said capability list index notification/instruction means exists in a server processor linked to said processor or processor modules via buses.

11. A data processing system having a mechanism for saving and restoring capabilities as set forth in claim 1, wherein said currently operating process, during normal processing, knows a destination of a server with which the currently operating process can communicate on the basis of capabilities given to the currently operating process, and communicates with said destination of one of the servers.

* * * * *

UNITED STATES PATENT AND TRADEMARK OFFICE
CERTIFICATE OF CORRECTION

PATENT NO. : 5,386,544
DATED : January 31, 1995
INVENTOR(S) : Kei NAKAMURA

It is certified that error appears in the above-indentified patent and that said Letters Patent is hereby corrected as shown below:

Col. 1, line 28, before "a" insert --to--;
line 29, delete "to".

Col. 3, line 47, change "numeral" to --. Numeral--.

Col. 4, line 4, change "means" to --unit--;
line 41, delete "of";
line 44, change "refers" to --refer--.

Col. 5, line 33, change "tile" to --the--;
line 62, delete "-".

Col. 6, line 6, change "token-a" to --token=a--;
line 7, change "token-b" to --token=b--.

Signed and Sealed this

Ninth Day of May, 1995

*Attest:*

BRUCE LEHMAN

*Attesting Officer*     *Commissioner of Patents and Trademarks*